Sept. 25, 1951     S. S. MIMS     2,569,250

DEHORNING DEVICE

Filed Nov. 3, 1949

*Inventor*

Samuel Stewart Mims

By *Clarence A. O'Brien and Harvey B. Jacobson*

*Attorneys*

Patented Sept. 25, 1951

2,569,250

UNITED STATES PATENT OFFICE 2,569,250

DEHORNING DEVICE

Samuel Stewart Mims, Atlanta, Ga., assignor of one-half to Henry B. Mims, Houghton Lake, Mich.

Application November 3, 1949, Serial No. 125,321

1 Claim. (Cl. 219—29)

This invention relates to the class of surgical instruments, and more particularly to a device for simplifying the dehorning of cattle and other livestock.

Previously in order to dehorn livestock by destroying the horn cells at the base of the horn button on these animals a caustic stick was rubbed on the horns of the animals when they were from two to four weeks old for about a quarter of an hour. Ordinarily the wounds then bled for about twenty-four hours and left a slowly healing sore. It was entirely possible that a drop of the caustic stick, which of course had previously been dipped in fluid, may have entered the animal's eyes and caused blindness. Very recently attempts have been made to destroy the horn cells by the application of heat thereto to prevent the horn development. This process is called "horn branding" or "branding process." Usually the method used has been to heat a dehorning iron by bringing it in contact with burning charcoal. It is therefore an object of the invention to provide a dehorning device having a cylindrical tip adapted to be electrically heated which will destroy the horn cells of a young animal while cauterizing the wound caused so as to minimize danger of infection.

A further object of the invention is to provide a dehorning device which has novel means for retaining the heat in the operating portions of the instrument while protecting the operator of the dehorning device from burns.

A further object of the invention is to provide a dehorning device which will have cylindrical tips having concave recesses in the end face to receive the horn button of the animal and to dehorn the animal and which may be made of different sizes, preferably three in number, that is, one of sufficient size to contact the horns so that a calf between the ages of one day to thirty days of age, a second one of sufficient size to contact the horns so that a calf between the ages of thirty and sixty days, and a third of sufficient size to contact the horn cells of a calf between the ages of sixty and ninety days.

These, together with the various ancillary objects of this invention which will become apparent as the following description proceeds, are attained by this dehorning device, a preferred embodiment of which has been illustrated in the accompanying drawings, by way of example, wherein.

Figure 1:
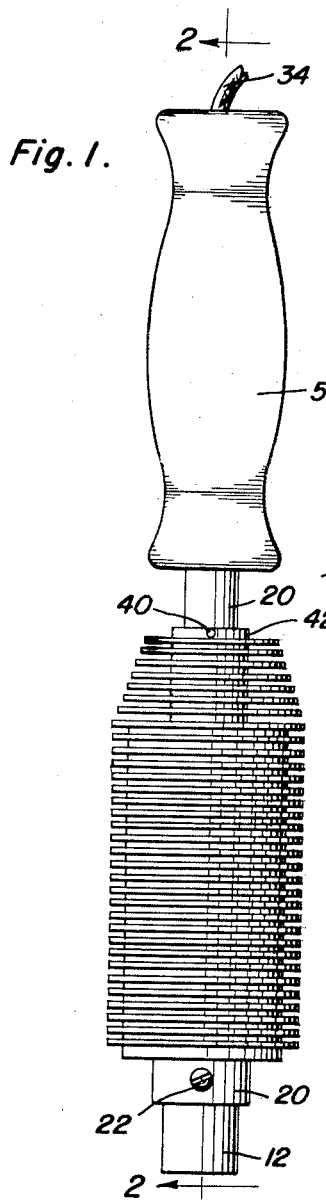
Figure 1 is a front elevational view of the dehorning device.
Figure 2:
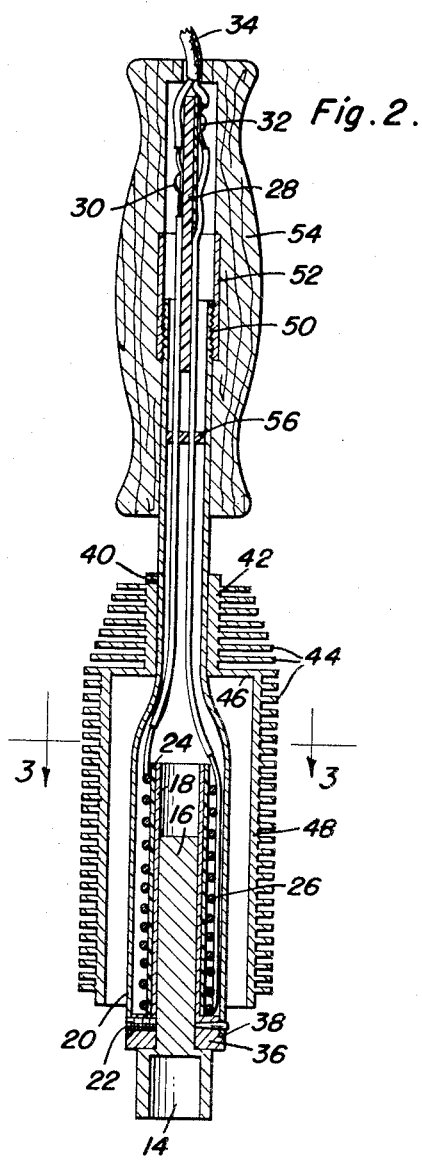
Figure 2 is a vertical sectional view as taken along line 2—2 in Figure 1 and showing the operative portions of the invention in greatest detail.
Figure 3:
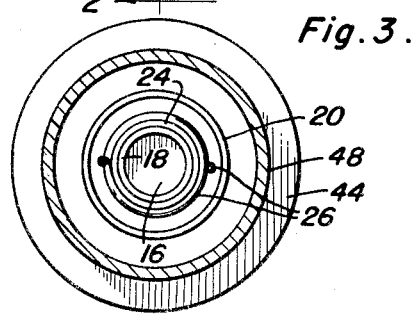
Figure 3 is a horizontal sectional view as taken along line 3—3 in Figure 2.

The numeral 10 generally designates the dehorning device comprising the present invention. This device consists of several principal elements, one of which is a copper tip 12 having a recess 14 opening at its through end, the inner portions of the tip covering a cylindrical shank 16 adapted to be received within a sleeve portion 18 of a bearing element adapted to be secured within the casing 20 by means of set screw 22.

The copper tip is of proper size and length to receive the horn button of the animal, the rim of the head surrounding the aperture 14 being of sufficient thickness to supply a branding area which will reach all of the horn cells embedded around and near the base of the horn button, and which, when heated to a temperature of about 670° F. is sufficient to destroy the horn cells. Copper tip 12, of course, is the portion of the device which protrudes from the end of the facing, the other portion of the tip being in the form of a cylindrical plunger 16 which fits within the sleeve 18. Positioned about the sleeve 18 is an arcuate insulative layer 24.

About the insulative cylinder 24 is wound a heating element or coil 26 which is connected through suitable conductors to an electrically insulative plate 28 at terminals 30 and 32 for electrical connection with a suitable plug-in cord 34. The bearing element of which sleeve 18 is one portion also comprises a bearing ring 36 having an aperture through which the plunger 16 is adapted to pass and has a shoulder 38 on which the edge of the casing 20 is adapted to seat.

The casing comprises a thickened portion through which the sleeve 18 is adapted to be received and a thinner portion integrally formed with the thickened portion. A bonnet, preferably made of light metal such as aluminum and of a cylindrical shape adapted to encompass the thickened portion of the casing is secured to the thinner portion of the casing by means of set screws 40 threadedly engaged within a tubular portion 42 slidably engaged on the casing. Substantially parallel fins 44 are secured to the sliding portion 42 and a flange 46 is integrally with such sliding portion 42 which has attached thereto a tubular portion 48 which extends about the second portion of the casing. The portion 48 is of sufficient diameter to encompass the thickened portion of the casing while leaving an air space therebetween. Such an air space is of course resistant to temperature changes and prevents the bonnet from becoming greatly heated. Thusly, the bonnet will retain heat within the casing 20 and thus aid in transmitting the heat to the copper tip 12. Additionally the bonnet will protect the operator from accidental burns. Additionally the air space provided between the bonnet and the casing will also prevent oxidation and a consequent forming of carbon on the copper tip, furthermore, it also serves to keep the heated part of the dehorner at a more uniform temperature under varying conditions of atmospheric temperature, such as when used in a barn that is comparatively warm, or in a corral where the temperature may be considerably lower.

The thinner portion of the casing 20 is threaded as at 50 so as to threadedly engage a sleeve 52 which is internally threaded and which is secured within the hollow interior of an electrically insulative handle 54. A spacer 56 also of electrically insulative material is used to guide the conductors from the heating coil to the plate 28.

Having described the invention, what is claimed as new is:

An electric dehorner comprising a tubular casing having a first portion of greater diameter than the second portion thereof, a handle connected to one end of said second portion, a bearing element secured to the first portion of said casing adjacent one end thereof, said bearing element extending within said first portion, an electrically insulative cylinder surrounding a portion of said bearing element, a dehorning tip, said tip including a shank disposed in said element, means carried by said element and engaging said shank releasably holding said shank in said bearing element, one end of said shank having a recess therein constituting a pocket within which a small animal horn is adapted to be accommodated, the portion of said shank having said recess located outwardly of said bearing element, an electrically operative heating element surrounding said cylinder, a bonnet secured at one end thereof to said second portion and extending about and encompassing said first portion, and said bonnet being formed with a plurality of spaced fins.

SAMUEL STEWART MIMS.

REFERENCES CITED

The following references are of record in the file of this patent:

UNITED STATES PATENTS

| Number | Name | Date |
|---|---|---|
| 1,137,573 | Carr | Apr. 27, 1915 |
| 2,064,645 | Abbott | Dec. 15, 1936 |
| 2,147,981 | Kuehl | Feb. 21, 1939 |
| 2,184,980 | Smith | Dec. 26, 1939 |
| 2,288,464 | Kitchner | June 30, 1942 |
| 2,366,910 | Kollath | Jan. 9, 1945 |

FOREIGN PATENTS

| Number | Country | Date |
|---|---|---|
| 504,838 | Great Britain | May 2, 1939 |